Figure 1:
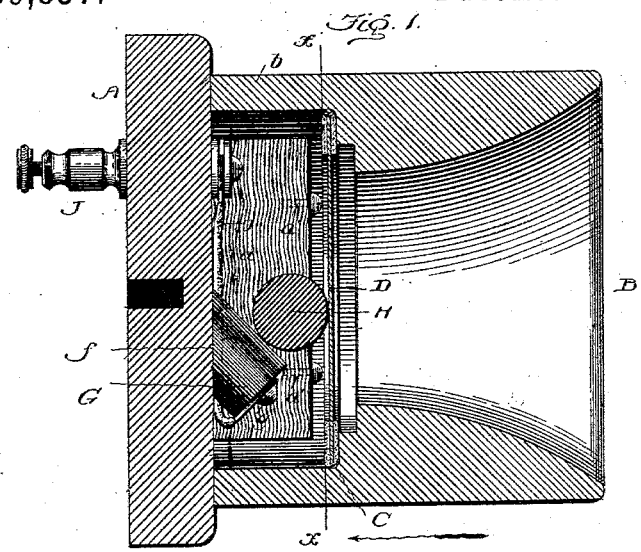

(No Model.)

N. BASSETT.
ELECTRIC TELEPHONE TRANSMITTER.

No. 559,837. Patented May 12, 1896.

Witnesses:

Nathan Bassett
Inventor

By Edson Bros
Att'ys

UNITED STATES PATENT OFFICE.

NATHAN BASSETT, OF PHILADELPHIA, PENNSYLVANIA, ASSIGNOR OF ONE-HALF TO WILLIAM F. BREITENBAUGH, OF SAME PLACE.

ELECTRIC-TELEPHONE TRANSMITTER.

SPECIFICATION forming part of Letters Patent No. 559,837, dated May 12, 1896.

Application filed November 14, 1895. Serial No. 568,939. (No model.)

*To all whom it may concern:*

Be it known that I, NATHAN BASSETT, a citizen of the United States, residing at Philadelphia, in the county of Philadelphia and State of Pennsylvania, have invented certain new and useful Improvements in Electric-Telephone Transmitters; and I do hereby declare the following to be a full, clear, and exact description of the invention, such as will enable others skilled in the art to which it appertains to make and use the same.

My invention relates to improvements in electric-telephone transmitters; and the objects that I have in view are, first, to provide a simple means by which the contact or bearing of the movable electrode upon the fixed electrodes may be changed by simply tapping against the diaphragm so as to present new surfaces of the electrode for contact with the diaphragm and thereby remove any disability which may exist in the transmitter and which operates to prevent it from transmitting articulate speech clearly and distinctly; secondly, to provide simple means for regulating the pressure of the movable electrode upon the diaphragm so as to make the instrument more or less sensitive to the vibrations of the diaphragm as may be desired or required, and, thirdly, to simplify and cheapen the construction of the instrument.

One of the causes of inoperativeness in a telephone-transmitter exists in the movable electrode which bears upon the diaphragm and which is influenced by the vibrations of the same to vary the pulsations in the current over the circuit, and in my improved transmitter I have so arranged and combined this movable electrode with relation to the fixed terminal electrodes that the point or line of contact between the fixed electrodes and said movable electrode may be changed and new surfaces of the electrode presented to the fixed electrodes by simply tapping against the diaphragm, whereby the defect in the instrument is overcome and it is restored to normal working condition.

In my improved transmitter I dispense with all manner of springs, levers, and equivalent adjusting devices ordinarily employed to hold the movable electrode in yielding contact with the vibratory diaphragm. This movable electrode is combined with inclined surfaces on fixed positive and negative terminal electrodes and with the diaphragm in a manner to rest or press against the diaphragm and remain in mechanical contact therewith solely by the weight or gravity of the movable electrode itself. The pressure or force with which this movable electrode bears upon or against the diaphragm may be regulated, either increased or diminished, so as to vary the sensitiveness of the instrument by changing the pitch or inclination of the surfaces of the fixed terminal electrodes, as may be required or desired.

My transmitter-diaphragm does not constitute one of the terminals or electrodes of the working circuit, nor is it equipped or provided with an electrode or contact which is included in the circuit. Said diaphragm is wholly independent of any positive or direct connections with a conductor of the circuit and is removable at will from the instrument. I employ two terminal electrodes to which are electrically connected the conductors of the circuit, and these terminal electrodes are arranged out of contact with each other and on the base or back of the instrument. Upon these terminal fixed electrodes rides or bears the movable electrode, which is arranged to span the space between the said terminal electrodes and which is in electrical contact with the said terminal electrodes and in mechanical contact with the diaphragm, the said movable electrode thus serving to close the circuit between the terminal electrodes upon which it has a rolling contact, and the movable electrode also serves, by reason of its contact with the diaphragm, to be influenced and vibrated by said diaphragm, whereby the movable rolling electrode is actuated by the vibrations in the diaphragm to create the pulsations in the electric circuit.

My invention further consists in the novelties of construction and arrangement of parts and in the combination of devices which will be hereinafter more fully described and claimed.

To enable others to understand my invention, I have illustrated the same in the accompanying drawings, forming a part of this specification, and in which—

Figure 2:
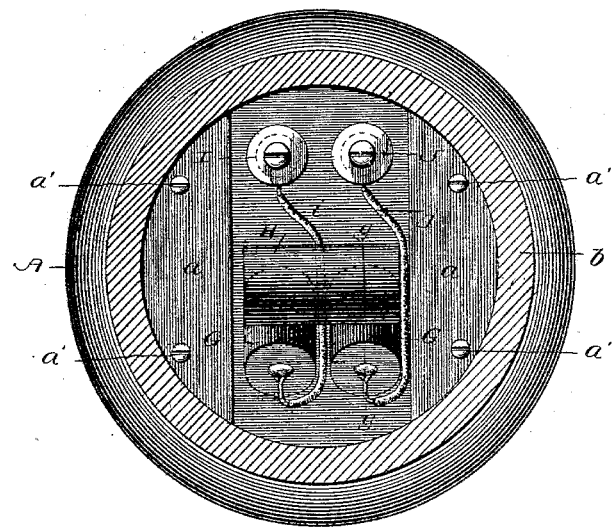
Figure 3:
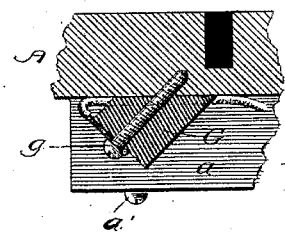

Figure 1 is a vertical sectional view taken through an electric-telephone transmitter constructed in accordance with my invention. Fig. 2 is a vertical transverse sectional view on the plane indicated by the dotted line $x$ $x$ of Fig. 1, looking in the direction indicated by the arrow toward the back of the instrument. Fig. 3 is a detail sectional view through one of the fixed terminal electrodes on the plane indicated by the dotted line $y$ $y$ of Fig. 2.

Like letters of reference denote corresponding parts in all the figures of the drawings, referring to which—

A designates the back or base of the instrument, and B is the mouthpiece thereof. These parts may be of the form shown in the drawings or they may be constructed and shaped in the usual well-known way. In the embodiment of my transmitter shown in the drawings I have made the base or back A of disk-like form, and the mouthpiece is of elongated cylindrical form. Said base has the blocks or supports $a$ $a$, in which are fastened the metallic points $a'$ $a'$, and against these points rest the soft rubber band or ring C, which incloses the edge or periphery of the metallic diaphragm D. The inner end of the mouthpiece B is rabbeted to produce the annular shoulder or flange $b$, and this rabbeted end of the mouthpiece is fitted over and around the supports $a$ $a$, so as to inclose within its rabbeted part the edge of the diaphragm D and the gasket or ring C, whereby the annular shoulder or ledge serves to press the gasket C up against the metallic points $a'$ $a'$, and the diaphragm D is thus peripherally clamped or held in place between the base and the mouthpiece in a manner to insure its free vibration when a person speaks into the transmitter. The rabbeted end of the mouthpiece rests or abuts up against the base or back A of the instrument, and said mouthpiece is thus made to house or inclose within itself the various working parts of the instrument, the diaphragm only being exposed, as is usual in devices of this character.

F G are the two fixed terminal electrodes which I use in my transmitter, and H is the movable electrode, which has electrical contact with or against the two fixed electrodes F G and which also spans the space between said fixed terminal electrodes, so as to thereby close the circuit. The terminal electrodes are spaced apart alongside each other, so as to be completely out of contact or insulated from one another. In the preferred embodiment of my transmitter shown in the accompanying drawings these terminal electrodes are made of carbon in the form of cylindrical pieces and with beveled or inclined ends $f$, (see Fig. 3,) and through these cylindrical carbon blocks or sticks are provided the openings $f'$.

The two terminal electrodes are arranged with their beveled ends $f$ $f$ against the back or base A and between the supports $a$ $a$ for the diaphragm, and said electrodes are fastened in place by means of screws $g$, which pass through the openings or passages $f'$ and are embedded in the base or back A. It will thus be seen that the terminal electrodes are fixed in inclined positions with relation to the back or base A and the diaphragm D, the axes of the two terminal electrodes being parallel to each other, and the pitch or inclination of these terminal electrodes with relation to the diaphragm can be changed by increasing or decreasing the bevel $f$ on the ends of the electrodes or by changing the angular position of the screws $g$, which fasten the electrodes F G in their fixed inclined positions and in parallel relation to each other.

I J are the binding-posts for the two circuit-conductors, one for the battery and the other for the line, as is usual in telephone systems, and these binding-posts are suitably mounted on the back or base A and they are independently connected to the terminal electrodes through the medium of the separate wires $i$ $j$. As shown more clearly by Fig. 2, the ends of the wires $i$ $j$ have their looped ends applied against the ends of the inclined terminal electrodes and fitted around the shanks of the holding-screws $g$, thus effecting good electrical connection between the wires and the terminal electrodes F G.

The movable electrode H is of carbon in the form of an elongated cylindrical stick or block. This cylindrical movable electrode is arranged to span between the spaced terminal electrodes F G, and it is fitted to roll and ride loosely and freely upon the inclined top surfaces of the said terminal electrodes, whereby the movable electrode bridges or forms a path for the current between the terminal electrodes, and thus serves as a circuit-closer between said electrodes F G. As the terminal electrodes are inclined relatively to the diaphragm D, the cylindrical movable electrode H has a normal tendency to rest or press against the diaphragm on a line across its middle or within the area of its periphery which is confined between the mouthpiece and the supports $a$ $a$ on the back or base A. This cylindrical movable electrode thus rests against the diaphragm to have contact therewith solely by the weight or gravity of the electrode itself, and, as has been explained, the pressure or force with which this movable electrode bears against the diaphragm may be regulated by changing the pitch or inclination of the fixed terminal electrodes F G. Said electrodes F G H, being made of carbon, are good electrical conductors.

When a person talks into the mouthpiece, vibrations are set up in the diaphragm and the cylindrical electrode H is caused to roll or play over and in contact with the fixed terminal electrodes in synchronism with the vibrations of the diaphragm. A series of alternating currents are thus sent through the line to the receiver which correspond in frequency to the vibrations of the diaphragm and in strength to their amplitude, which in turn correspond to the pitch, loudness, and timbre of the voice. When these alternating currents reach the receiver, they pass through the coils and exert magnetic force upon the receiver-diaphragm to produce vibrations therein precisely similar to those of the transmitter-diaphragm, so that sounds emitted by the receiver are precisely similar to those of the voice actuating the transmitter.

Should the transmitter fail to work properly, the user should tap slightly against the diaphragm, which will thus set up vibrations therein and cause the cylindrical electrode to roll and change the points or lines of contact between itself and the terminal electrodes, thus presenting new surfaces of the cylindrical movable electrode to the said fixed electrodes.

I am aware that changes in the form and proportion of parts and in the details of construction of the device herein shown and described as the preferred embodiment of my invention can be made by a skilled mechanic without departing from the spirit or sacrificing the advantages of my invention, and I therefore reserve the right to make such modifications as fairly fall within the scope of my invention.

Having thus fully described my invention, what I claim as new, and desire to secure by Letters Patent, is—

1. In a telephone-transmitter, the combination with a diaphragm, of fixed terminal electrodes, and a movable electrode which bridges said terminal electrodes and is in electrical contact therewith and which bears or presses against the diaphragm, substantially as and for the purposes described.

2. In a telephone-transmitter, the combination with a diaphragm, of fixed terminal electrodes insulated from each other and arranged in close juxtaposition to said diaphragm, and a movable electrode which bridges, and is in electrical connection with, said fixed electrodes and which is sustained thereby in such relation to said diaphragm as to press or bear against the latter solely by the gravity of said movable electrode, substantially as and for the purposes described.

3. In a telephone-transmitter, the combination with a diaphragm, of the terminal electrodes having bearing-surfaces inclined with relation to said diaphragm, and a movable electrode which bridges, and has a rolling electrical contact with, said terminal electrodes and which movable electrode is sustained by the terminal electrodes in a manner to press or bear against the diaphragm by the gravity of the movable electrode itself, substantially as and for the purposes described.

4. In a telephone-transmitter, the combination with a diaphragm, of a pair of terminal electrodes fixed in variable inclined positions relative to the diaphragm, and a movable electrode arranged to bridge the terminal electrodes and to bear or press against said diaphragm, substantially as and for the purposes described.

5. In a telephone-transmitter, the combination with a base, and a diaphragm, of a pair of beveled terminal electrodes fixed to said base, and a gravity cylindrical electrode which bridges the terminal electrodes and bears against the diaphragm, substantially as and for the purposes described.

In testimony whereof I affix my signature in presence of two witnesses.

NATHAN BASSETT.

Witnesses:
HELEN H. GOW,
F. M. HUTCHINSON.